INVENTOR.
UENO HIROMITSU 3,250,489
FISHING REEL WITH SELECTIVELY OPERABLE
SPEED SELECTING MEANS
Ueno Hiromitsu, Tokyo-to, Japan, assignor to Olympic
Fishing Tackle Co., Tokyo-to, Japan
Filed Jan. 14, 1964, Ser. No. 337,558
Claims priority, application Japan, Jan. 21, 1963,
38/2,390
6 Claims. (Cl. 242—84.54)

This invention relates to fishing reels and, more particularly, to a fishing reel including a novel two-speed transmission means coupling a drive handle to a bobbin and in which either of the two speeds may be readily selected by means of operating an externally accessible speed selecting member.

An object of the present invention is to provide a fishing reel including a two-speed transmission connected between an operating handle and a flyer, and further including manually accessible and operable speed selecting means.

Another object of this invention is to provide a fishing reel including such a two-speed transmission in which there are two gear trains provided between the operating handle and the flyer, with means selectively operable to couple either one of these gear trains to the operating handle.

Still another object of the invention is to provide a fishing reel including a two-speed gear train of the type mentioned which includes two sets of interengageable coupling means, both associated with the operating handle and each associated with a respective gear train, and manually operable cam means to render effective one or the other of the coupling means.

These and other objects, advantages and novel features of the invention will be apparent from the following description and the accompanying drawings illustrating a typical, but not limiting, embodiment of the invention.

Figure 1:
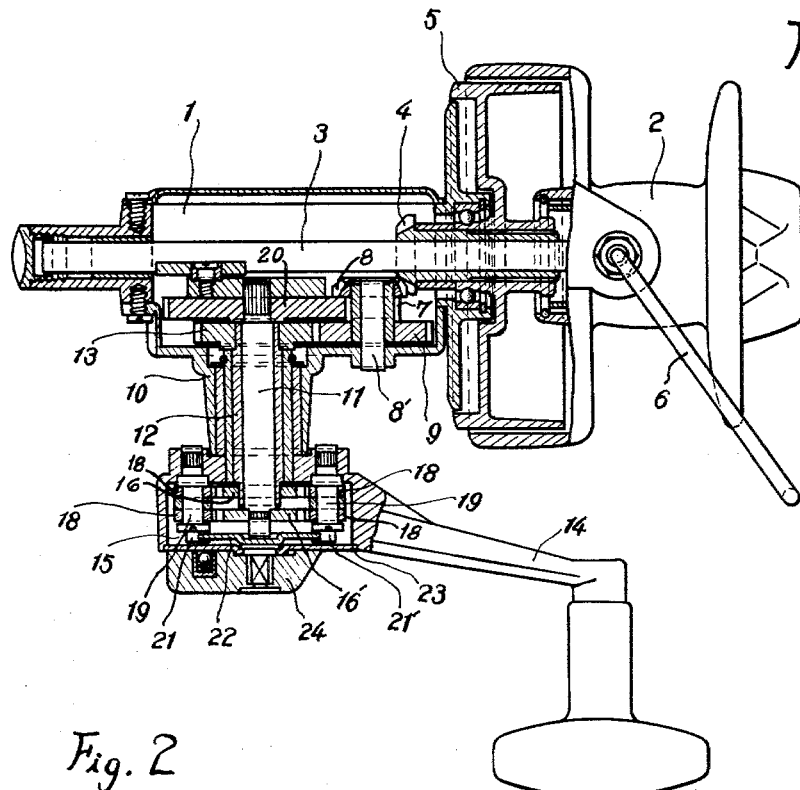
FIG. 1 is a side elevation view, partly in section, of a fishing reel embodying the invention.

Referring to the drawings, a fishing reel embodying the invention is illustrated as including a body or a housing 1 and a bobbin 2 which is secured to a shaft 3 which is frictionally rotatable within the body 1. A relatively elongated tubular sleeve is frictionally rotatable on the shaft 1, being frictionally coupled thereto. The inner end of this sleeve is formed as a bevel pinion 4, and the sleeve is mounted in the hub of a conventional flyer 5 carrying line winding guide 6 connected thereto at a point rearwardly of bobbin 2. Suitable friction means (not shown) connect bobbin 2 to shaft 3 with a pressure regulated by an adjustment nut forward of the spool.

Bevel pinion meshes with a bevel gear 8 which is secured to rotate with a sleeve formed with a relatively small diameter gear 7 and having secured thereto a relatively large diameter gear 9.

The handle support structure 10 projects laterally from the body 1 in a direction substantially perpendicular to the axis of the shaft 3. This handle support structure 10 has rotatably mounted therein a shaft 11 on which is telescoped a second shaft 12 which is tubular. The inner end of tubular shaft 12 has fixed thereto a gear 13 meshing with the gear 9. Similarly, the inner end of the central shaft 11 has secured thereto a gear 20 which meshes with the gear 7.

The operating handle is indicated at 14 as including a housing portion or chamber 15 which is rotatably mounted on the tubular shaft 12. Within the chamber 15, there is a pair of axially spaced circular coupling or clutch plates 16, 16'. Plate 16 is secured to the inner end of tubular shaft 12, and plate 16' is secured to the inner end of the shaft 11 which projects inwardly beyond the inner end of the shaft 12. Each of the coupling plates 16 and 16' has notches 17 in its periphery, and in the illustrated embodiment there are a pair of diametrically opposite notches 17 formed in the periphery of each plate 16 and 16'. The notches are arranged to be engaged by the free or working ends of spring biased dogs or pawls 18. The pawls or dogs 18 are arranged in pairs, with the pawls of one pair being directed oppositely from the pawls of the other pair. The pawls are oscillatably mounted on pins 19 secured in the chamber 15 and all the pawls are biased, by springs 25, toward engagement with respective recesses 17 in either the plate 16 or the plate 16'. However, only that pair of pawls associated with a respective one of the coupling plates 16 or 16' may be engaged at any given time, with the other pair being disengaged from its respective coupling plate 16 or 16'.

To effect this, each of the pawls is provided with a pin 21 or 21'. Those pawls having the pins 21' are arranged to engage the recesses 17 in a plate 16' and those pawls having the pins 21 are arranged to engage in the recesses 17 in plate 16.

A cam plate 22 is secured to rotate with a shaft extending through an outer wall or closure plate 23 of the chamber 15, the shaft being secured to a selector knob 24 on the outer surface of wall or closure plate 23. As illustrated in FIG. 1, a spring biased ball detent means may be provided to control movement of knob 24 to either of a pair of selected positions. Cam plate 22 is formed with two pairs of ramps 26, 26 and 26', 26'. The ramps of each pair are substantially diametrically opposite each other. Ramps 26, 26 are arranged to cooperate with pins 21, 21, and ramps 26', 26' are arranged to cooperate with pins 21', 21'. Ramps 26, 26 slope in a circumferential direction opposite to the direction of slope of the ramps 26', 26'.

Figure 2:
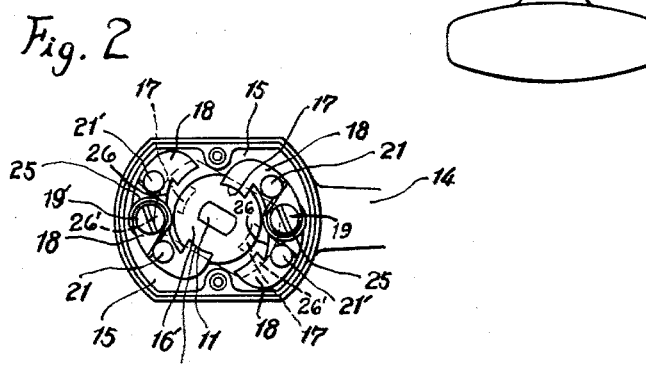
FIG. 2 is an outside end elevation view of the means for selectively coupling either one of a pair of gear trains to the operating handle; and, FIG. 3 is a partial outside elevation view of the handle illustrating the manually accessible and operable speed selecting means.
Figure 3:
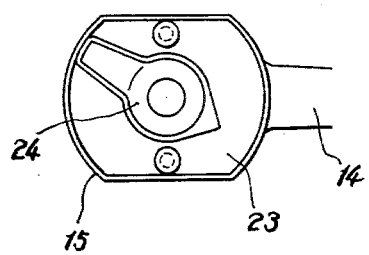

When knob 24 is moved in one direction, ramps 26, 26 engage pins 21, 21 to lift the associated pawls 18 out of the recesses 17 of the associated plates 16'. When knob 24 is moved in the opposite direction to correspondingly move cam plate 22, ramps 26', 26' engage pins 21', 21' to disengage the associated pawls from the recesses 17 of the plate 16. This is the position which is illustrated in FIG. 2.

Thus, by selective movement of knob 24 between either one of two positions, either the plate 16 or the plate 16' is effectively coupled to the chamber 15 and thus to rotate with the handle 14. Thus, either the gear train involving the plate 16, tubular shaft 12, gear 13 and gear 9 is operated, or the second gear train involving the plate 16', the inner shaft 11, the gear 20 and the gear 7 is operative. Thereby, a ready and easy selection of the speed of operation of the flyer may be made by the described structure.

While a specific embodiment of the invention has been shown and described in detail to illustrate the application of the principles of the invention, it will be understood that the invention may be embodied otherwise without departing from such principles.

What is claimed is:

1. A fishing reel, comprising, in combination, a main body; a flyer rotatably mounted on said main body; a handle rotatably mounted on said main body; a flyer drive gear rotatable with said flyer; output gear means rotatably mounted in said body and meshing with said flyer drive gear; a pair of gear trains each coupled to said output gear means and each including an input element operatively associated with said handle, said gear trains having respectively different gear ratios applicable to said output gear means; first and second coupling means each operable to couple a respective one of said input elements to said handle for rotation of the associated input element by said handle; means biasing said coupling means to engage the associated input elements; cam means selectively operable to disengage one of said coupling means from its associated input element while providing for the other of said coupling means to remain engaged with its input element; and an externally accessible manual operating element coupled to said cam means and movable between a first position coupling one input element to said handle and a second position coupling the other input element to said handle; one of said gear trains including a shaft co-axial with the axis of rotation of said handle and the other of said gear trains including a tubular shaft telescoped over said first shaft.

2. A fishing reel, as claimed in claim 1, in which said first shaft extends, at one end, axially beyond said tubular shaft; said first and second input elements comprising a first input element secured to rotate with said tubular shaft and a second input element secured to the projecting portion of said first shaft.

3. A fishing reel, as claimed in claim 2, including first and second pawl means, forming part of said coupling means, fixed to said handle; said first pawl means being engageable with said first input element and said second pawl means being engageable with said second input element; said cam means being operable on said first and second pawl means to selectively engage one or the other thereof with its associated input element.

4. A fishing reel, as claimed in claim 3, in which each of said input elements comprises a substantially circular plate having notches engaged by the operative ends of the associated pawl means.

5. A fishing reel, as claimed in claim 4, including means biasing said pawl means to the input element engaging position; each of said pawl means comprising a pair of pawls with each pawl having a projecting pin thereon; said cam means being engageable with said projecting pins.

6. A fishing reel, as claimed in claim 5, in which the inner end of said handle is formed as a chamber enclosing said input elements and said pawl means; said chamber including an end wall mounting said externally accessible manual operating means.

References Cited by the Examiner

UNITED STATES PATENTS

| | | |
|---|---|---|
| 1,162,253 | 11/1915 | Richard. |
| 2,049,103 | 7/1936 | Baumgartner _____ 192—481 X |
| 2,487,387 | 11/1949 | Sears et al. _____ 242—84.1 |

FOREIGN PATENTS 918,476   9/1954   Germany.

STANLEY N. GILREATH, *Primary Examiner.*

MERVIN STEIN, *Examiner.*

B. S. TAYLOR, *Assistant Examiner.*